(12) United States Patent
You et al.

(10) Patent No.: US 11,046,610 B2
(45) Date of Patent: Jun. 29, 2021

(54) LOW-EMISSIVITY COATING, AND FUNCTIONAL BUILDING MATERIAL FOR WINDOWS AND DOORS COMPRISING LOW-EMISSION COATING

(71) Applicant: LG Hausys, Ltd., Seoul (KR)

(72) Inventors: Hyun-Woo You, Incheon (KR); Youn-Ki Jun, Gwacheon-si (KR); Dae-Hoon Kwon, Anyang-si (KR); Sung-Jin Park, Incheon (KR); Young-Woo Choi, Anyang-si (KR)

(73) Assignee: LG HAUSYS, LTD., Seoul (KR)

( * ) Notice: Subject to any disclaimer, the term of this patent is extended or adjusted under 35 U.S.C. 154(b) by 0 days.

(21) Appl. No.: 16/331,280

(22) PCT Filed: Jan. 13, 2017

(86) PCT No.: PCT/KR2017/000443
§ 371 (c)(1),
(2) Date: Mar. 7, 2019

(87) PCT Pub. No.: WO2018/048038
PCT Pub. Date: Mar. 15, 2018

(65) Prior Publication Data
US 2019/0352224 A1    Nov. 21, 2019

(30) Foreign Application Priority Data
Sep. 9, 2016  (KR) .................. 10-2016-0116340

(51) Int. Cl.
B32B 15/04    (2006.01)
B32B 17/06    (2006.01)
(Continued)

(52) U.S. Cl.
CPC ........ *C03C 17/366* (2013.01); *C03C 17/3618* (2013.01); *C03C 17/3626* (2013.01);
(Continued)

(58) Field of Classification Search
CPC ..... B32B 17/06; B32B 17/00; B32B 2250/05; B32B 17/10018; B32B 2255/28;
(Continued)

(56) References Cited

U.S. PATENT DOCUMENTS 6,974,630 B1 * 12/2005 Stachowiak ............ C03C 17/36
428/428
8,119,194 B2 * 2/2012 Koekert .................. C03C 17/36
427/162
(Continued)

FOREIGN PATENT DOCUMENTS

DE    102005039707 A1    3/2007
EP        1734019 A2    12/2006
(Continued)

OTHER PUBLICATIONS

International Search Report dated May 25, 2017, corresponding to International Application No. PCT/KR2017/000443.
(Continued)

*Primary Examiner* — Lauren R Colgan
(74) *Attorney, Agent, or Firm* — Hauptman Ham, LLP

(57) ABSTRACT

Provided are: a low-emissivity coating comprising, in sequence, a first lower dielectric layer, a barrier layer, a second lower dielectric layer, a low-emissivity protective layer, a low-emissivity layer, a low-emissivity protective layer, and an upper dielectric layer; and a functional building material for windows and doors comprising the low-emissivity coating.

4 Claims, 2 Drawing Sheets

(51) Int. Cl.
*C03C 17/36* (2006.01)
*E06B 9/24* (2006.01)

(52) U.S. Cl.
CPC ...... *C03C 17/3644* (2013.01); *C03C 17/3649* (2013.01); *E06B 9/24* (2013.01); *C03C 2218/155* (2013.01); *C03C 2218/156* (2013.01); *E06B 2009/2464* (2013.01)

(58) Field of Classification Search
CPC .............. C03C 2217/78; C03C 17/366; C03C 17/3626; C03C 17/3644; C03C 17/3411; C03C 17/36; C03C 17/3618; C03C 17/3681; C03C 17/3435; C03C 17/3613; C03C 17/3652; C03C 17/34; C03C 17/361; C03C 17/3642; C03C 2217/70; G02B 1/14; G02B 1/115; G02B 5/208; Y10T 428/2495; Y10T 428/24967; Y10T 428/24975; Y10T 428/263; Y10T 428/264
USPC ................ 428/426, 428, 432, 434, 701, 702
See application file for complete search history.

(56) References Cited

U.S. PATENT DOCUMENTS

| | | | | |
|---|---|---|---|---|
| 8,545,985 | B2* | 10/2013 | Laird | C03C 17/36 428/428 |
| 9,354,755 | B2* | 5/2016 | Den Boer | G06F 3/0412 |
| 9,505,652 | B2 | 11/2016 | Kim et al. | |
| 9,921,703 | B2* | 3/2018 | Den Boer | G06F 3/044 |
| 10,222,921 | B2* | 3/2019 | Krasnov | G06F 3/044 |
| 10,336,651 | B1* | 7/2019 | Disteldorf | C03C 17/3644 |
| 10,444,926 | B2* | 10/2019 | Den Boer | G02F 1/13338 |
| 2004/0086723 | A1* | 5/2004 | Thomsen | C03C 17/36 428/426 |
| 2009/0186213 | A1 | 7/2009 | Ihlo et al. | |
| 2010/0279144 | A1* | 11/2010 | Frank | C03C 17/36 428/623 |
| 2011/0262726 | A1* | 10/2011 | Knoll | C03C 17/36 428/213 |
| 2012/0028009 | A1 | 2/2012 | Gerardin et al. | |
| 2013/0216860 | A1* | 8/2013 | Imran | C03C 17/3618 428/623 |
| 2016/0207826 | A1* | 7/2016 | Kim | C09D 1/00 |
| 2016/0299259 | A1* | 10/2016 | You | C09D 7/20 |

FOREIGN PATENT DOCUMENTS

| | | |
|---|---|---|
| JP | 2009-528560 A | 8/2009 |
| JP | 2014-513028 A | 5/2014 |
| JP | 2017-500267 A | 1/2017 |
| KR | 10-2011-0062566 A | 6/2011 |
| KR | 10-2013-0051521 A | 5/2013 |
| KR | 10-2014-0082153 A | 7/2014 |
| KR | 10-2015-0026256 A | 3/2015 |
| KR | 10-2015-0069534 A | 6/2015 |
| WO | 2015/030549 A1 | 3/2015 |
| WO | 2015/088267 A1 | 6/2015 |
| WO | 2015088269 A1 | 6/2015 |
| WO | WO2015088269 * | 6/2015 |

OTHER PUBLICATIONS

European Search Report dated Jul. 19, 2019, in connection with counterpart European Patent Application No. 17848923.3.
Japanese Office Action dated Feb. 5, 2021 in connection with the counterpart Japanese Patent Application No. 2019-512984.

* cited by examiner

LOW-EMISSIVITY COATING, AND FUNCTIONAL BUILDING MATERIAL FOR WINDOWS AND DOORS COMPRISING LOW-EMISSION COATING

CROSS REFERENCE TO RELATED APPLICATION

This present application is a national stage filing under 35 U.S.C § 371 of PCT application number PCT/KR2017/000443 filed on Jan. 13, 2017 which is based upon and claims the benefit of priority to Korean Patent Application No. 10-2016-0116340 filed on Sep. 9, 2016 in the Korean Intellectual Property Office. The disclosures of the above-listed applications are hereby incorporated by reference in their entireties.

TECHNICAL FIELD

The present disclosure relates to a low-emissivity coating and a functional building material for a window and a door containing the low-emissivity coating.

BACKGROUND

A low-emissivity glass refers to a glass on which a low-emissivity layer containing a metal with a high reflectance in an infrared region such as silver (Ag) is deposited as a thin film. This low-emissivity glass is a functional material to reflect radiation in the infrared region, thereby blocking outdoor solar radiation in summer and to save energy of a building by preserving indoor radiant heat in winter.

In general, the silver (Ag) used for the low-emissivity layer is oxidized when exposed to air. Thus, a dielectric layer as an oxidation-preventive layer is deposited on each of top and bottom faces of the low-emissivity layer. This dielectric layer also serves to increase a visible light transmittance.

DISCLOSURE

Technical Purpose

One implementation of the present disclosure provides a low-emissivity coating that realizes excellent durability by improving heat resistance, moisture resistance and abrasion resistance.

Another implementation of the present disclosure provides a functional building material for a window and a door containing the low-emissivity coating.

However, the technical purpose to be achieved by the present disclosure is not limited to the purpose as mentioned above. Other purposes as not mentioned above may be clearly understood to those skilled in the art from descriptions made below.

Technical Solution

In one implementation of the present disclosure, there is provided a low-emissivity coating including a vertical sequential stack of a first lower dielectric layer, a barrier layer, a second lower dielectric layer, a low-emissivity protective layer, a low-emissivity layer, a low-emissivity protective layer and an upper dielectric layer in this order.

In one embodiment, the low-emissivity coating includes a vertical sequential sub-stack of the first lower dielectric layer, the barrier layer and the second lower dielectric layer in this order.

In one embodiment, the low-emissivity coating includes the barrier layer between the first and second lower dielectric layers. This barrier layer is effective to prevent migration and diffusion of the alkaline ions and oxygen, and thus migration and diffusion of substances contained in the low-emissivity layer resulting from the high-temperature tempering process, which is essentially necessary after the coating is formed on a transparent substrate such as a glass. Accordingly, the low-emissivity coating can achieve excellent heat resistance, moisture resistance and abrasion resistance for a long period of time.

In one embodiment, the low-emissivity coating may include the lower dielectric layer and the upper dielectric layer. The lower dielectric layer may be divided into the first lower dielectric layer and the second lower dielectric layer.

In one embodiment, each of the first lower dielectric layer and the second lower dielectric layer has a thickness of 5 nm to 50 nm.

In one embodiment, each of the first lower dielectric layer, the second lower dielectric layer and the upper dielectric layer may be made of a material having a light extinction coefficient which is substantially zero or very close to zero.

In one embodiment, the low-emissivity coating may further include a top protective layer on a top face of the upper dielectric layer.

In one implementation of the present disclosure, there is provided a functional building material for a window and a door, the functional building material comprising: a transparent substrate; and the low-emissivity coating formed on at least one face of the transparent substrate.

In one embodiment, the functional building material includes the low-emissivity coating, which includes the barrier layer between the first and second lower dielectric layers. Thus, the functional building material can realize excellent heat resistance, moisture resistance and abrasion resistance for a long period of time.

Technical Effect

The low-emissivity coating and the functional building material for the window and the door may improve durability by improving the heat resistance, moisture resistance, and abrasion resistance.

DETAILED DESCRIPTIONS

Figures 1, 2:
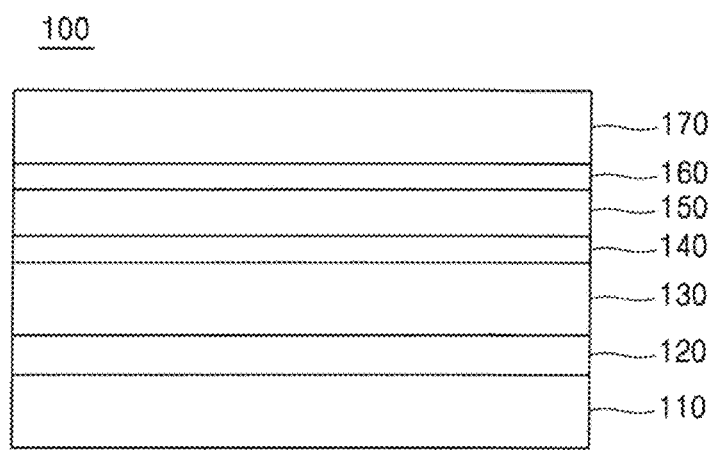
FIG. 1 is a schematic cross-sectional view of a low-emissivity coating according to one implementation of the present disclosure.
FIG. 2 shows optical microscope images of low-emissivity coating surfaces as prepared according to Present Example and Comparative Example under a specific condition after evaluating heat resistances of window functional building materials including the low-emissivity coating as prepared according to Present Example and Comparative Example.

As used herein, terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof.

As used herein, formation of a first structure above (or below) or on (or beneath) a second structure means that the first structure is formed in direct contact with a top face (or a bottom face) the second structure or means that a third structure is intervened between the first and second structures.

As used herein, the term "substantially," "about," and similar terms are used as terms of approximation and not as terms of degree, and are intended to account for the inherent deviations in measured or calculated values that would be recognized by those of ordinary skill in the art. The term may be used to prevent unauthorized exploitation by an unauthorized infringer to design around accurate or absolute figures provided to help understand the present disclosure.

Hereinafter, with reference to the accompanying drawings, embodiments of the present disclosure will be described in detail so that a person skilled in the art can readily carry out the present disclosure.

In order to clearly illustrate the present disclosure, descriptions of well-known portions will be omitted, and the same or similar components are denoted by the same reference numerals throughout the specification. Further, in the drawings, a thickness is enlarged to clearly indicate a layer and a region. In the drawings, for convenience of illustration, thicknesses of some layers and regions are exaggerated.

It should be understood, however, that the present disclosure may be embodied in many different forms and that implementations set forth below are merely illustrative of the present disclosure and thus the present disclosure is not limited to the implementations described herein.

In one implementation of the present disclosure, there is provided a low-emissivity coating. The coating may include a vertical sequential stack of a first lower dielectric layer, a barrier layer, a second lower dielectric layer, a low-emissivity protective layer, a low-emissivity layer, a low-emissivity protective layer and an upper dielectric layer in this order.

Specifically, the low-emissivity coating may include a vertical sequential stack of the first lower dielectric layer, the barrier layer, and the second lower dielectric layer.

The low-emissivity coating is embodied as a multilayer thin film structure including the low-emissivity layer that selectively reflects far-infrared rays among solar radiation rays. This low-emissivity layer may lower an emissivity and allow the low-emissivity coating to have an excellent thermal insulating performance due to its low-emissivity (i.e., low-e: low emissivity effect).

The low-emissivity coating may be formed to have the above configuration. For example, when the coating is applied as a coated film on a window glass, the coating reflects outdoor solar radiations in summer, and saves energy of a buildings by minimizing heat transfer between indoor and outdoor and preserving indoor radiant heat in winter. Thus, the low-emissivity coating may act as a functional material.

As used herein, a term "emissivity" refers to a ratio of energy which an object absorbs, transmits and reflects to input energy at a certain wavelength. That is, as used herein, the emissivity represents a ratio of absorbed infrared energy to input infrared energy in an infrared wavelength region. Specifically, the term "emissivity" refers to a ratio of infrared energy absorbed by the object to a total applied infrared energy when a far-infrared ray corresponding to a wavelength range of about 5 μm to about 50 μm having a strong thermal action is applied.

According to Kirchhoff's law, the infrared energy absorbed by an object is equal to the infrared energy emitted by the object again. Thus, the absorbance and emissivity of the object have the same value.

Further, because the infrared energy that is not absorbed by the object is reflected from a surface of the object, the higher the reflectance of the infrared energy from the object, the lower the emissivity of the object. Numerically, this may be expressed as a relationship of infrared ray emissivity=1−infrared ray reflectance.

The emissivity may be measured using various methods commonly known in the art. For example, the emissivity may be measured by a facility such as a Fourier transform infrared spectroscope (FT-IR) according to a KSL2514 standard.

For an arbitrary object, for example, the low-emissivity glass, the absorbance, that is, the emissivity, of the far infrared rays exhibiting such a strong thermal action may be very important factor in measuring the heat insulating performance thereof.

When the low-emissivity coating is applied as a coating film onto the transparent glass substrate, the coating maintains a predetermined transmission characteristic in a visible light region to realize good natural lighting performance and further provides an excellent thermal insulation effect by lowering the emissivity in the infrared region. Thus, the low-emissivity coating may act as a functional building material for an energy-saving window.

In general, a functional building material for a window and a door such as a window glass is inevitably subjected to a tempering process, which is performed at a high temperature of 700° C. or higher, in order to improve the impact resistance and heat resistance. During this tempering process, alkali ions such as sodium ions ($Na^+$) and oxygens in the glass are diffused into the low-emissivity coating film. Thus, the alkali ions are physically or chemically diffused to the film, and thus the low-emissivity coating film is easily damaged.

Thus, in one implementation of the present disclosure, the low-emissivity coating includes the barrier layer between the first and second lower dielectric layers. For example, this barrier layer is effective to prevent migration and diffusion of the alkaline ions and oxygen, and thus migration and diffusion of substances contained in the low-emissivity layer resulting from the high-temperature tempering process, which is essentially necessary after the coating is formed on a transparent substrate such as a glass. Accordingly, the low-emissivity coating can achieve excellent heat resistance, moisture resistance and abrasion resistance for a long period of time.

FIG. 1 schematically shows a cross section of the low-emissivity coating 100 according to one implementation of the present disclosure. In one implementation of the present disclosure, the low-emissivity coating 100 may include a vertical sequential stack of a first lower dielectric layer 110, a barrier layer 120, a second lower dielectric layer 130, a low-emissivity protective layer 140, a low-emissivity layer 150, a low-emissivity protective layer 160 and an upper dielectric layer 170 in this order.

The low-emissivity layer may be embodied as a layer of electrically conductive material, such as a metal, which may have a low emissivity. That is, the low-emissivity layer has a low sheet resistance and therefore a low emissivity.

For example, the low-emissivity layer may have an emissivity of about 0.01 to about 0.3, specifically about 0.01 to about 0.2, more specifically about 0.01 to about 0.1, and still more specifically about 0.01 to about 0.08.

The low-emissivity layer having the above defined emissivity range may simultaneously achieve excellent natural-lighting performance and thermal insulation effect by properly adjusting visible light transmittance and infrared ray emissivity. The low-emissivity layer having the above defined emissivity range may have a sheet resistance of, for example, from about 0.78 Ω/sq to about 6.42 Ω/sq. The present disclosure is not limited thereto.

The low-emissivity layer selectively transmits and reflects solar radiations, and has a low-emissivity due to its high reflectivity of the solar radiation in the infrared region.

The low-emissivity layer may include, but is not limited to, at least one selected from a group consisting of Ag, Au, Cu, Al, Pt, ion-doped metal oxide, and combinations thereof. A material of the low-emissivity layer may include any of metals known to be capable of achieving low-emissivity performance. The ion doped metal oxide may include, for example, indium tin oxide (ITO), fluorine doped tin oxide (FTO), Al doped zinc oxide (AZO), gallium zinc oxide (GZO), and the like.

In one implementation, the low-emissivity layer may be embodied as a layer made of silver (Ag). As a result, the low-emissivity coating can achieve a high electrical conductivity, a low absorption in a visible light range, and durability.

A thickness of the low-emissivity layer may be, for example, in a range of from about 5 nm to about 25 nm. The low-emissivity layer with the thickness in the above range may be suitable for simultaneously achieving the low infrared emissivity and the high visible light transmittance.

In one implementation, each of the low-emissivity protective layers may have an extinction coefficient of about 1.5 to about 3.5 in the visible light region. The extinction coefficient is a value derived from an optical constant, which is a characteristic inherent to a material. The optical constant may be expressed as n-ik. In this connection, a rear part n refers to a refractive index, and an imaginary part k refers to the extinction coefficient (referred to as absorption coefficient). The extinction coefficient is a function of a wavelength $\lambda$. For a metal, the extinction coefficient is generally greater than zero. The extinction coefficient k has a following relationship with an absorption coefficient $\alpha$: $\alpha=(4\pi k)\lambda$. The absorption coefficient $\alpha$ has a following relationship with d as a thickness of a medium through which a light beam passes, I0 as an intensity of an output light beam from the medium and an intensity I of an input light beam to the medium: $I=I0\exp(-\alpha d)$. Thus, due to the absorption of the light beam by the medium, the intensity of the output beam is lower than the intensity of the input beam.

The low-emissivity protective layer may be made of a metal having the extinction coefficient in the above range in the visible light region to absorb a certain proportion of the visible light to allow the low-emissivity coating to render a predetermined color.

For example, each of the low-emissivity protective layers may include at least one selected from a group consisting of nickel (Ni), chromium (Cr), niobium (Nb), nickel-chromium alloy (Ni—Cr), titanium (Ti), nickel-titanium (Ni—Ti) alloy, and combinations thereof. However, the present is not limited thereto.

Each of the low-emissivity protective layers may be embodied as a single layer or a stack of a plurality of layers. The low-emissivity protective layer may be disposed on top and/or bottom faces of the low-emissivity layer. As shown in FIG. 1, the low-emissivity protective layers may sandwich the low-emissivity layer therebetween.

A thickness of each of the low-emissivity protective layers may be, for example, in a range of from about 0.5 nm to about 5 nm. The present disclosure is not limited thereto. The thickness may vary suitably according to a purpose of the window.

When the low-emissivity coating has the low-emissivity protective layers in the above thickness range, the coating may adjust a transmittance and a reflectance thereof to a predetermined transmittance and a predetermined reflectance respectively while performing a function executed by the low-emissivity protective layers.

In one implementation, the low-emissivity coating may include the lower dielectric layer and the upper dielectric layer. The lower dielectric layer may be divided into the first lower dielectric layer and the second lower dielectric layer.

As described above, the low-emissivity coating includes the barrier layer between the first and second lower dielectric layers. This barrier layer may effectively prevent the damage of the low-emissivity coating, thereby to achieve long-term excellent heat resistance, excellent moisture resistance and excellent abrasion resistance.

Each of the first lower dielectric layer, the second lower dielectric layer and the upper dielectric layer may be made of a material having a light extinction coefficient which is substantially zero or very close to zero. When the extinction coefficient is greater than 0, this means that the incident light is absorbed into each of the dielectric layers before reaching the low-emissivity layer. This is undesirable because this may disallow securing a transparent visual field. Thus, in one example, the extinction coefficient of each of the dielectric layers may be lower than about 0.1 in the visible light region (that is, in a wavelength range of about 380 nm to about 780 nm). As a result, each of the dielectric layers may allow excellent natural-lighting performance, thereby helping to ensure a clear view.

Each of the first lower dielectric layer, the second lower dielectric layer and the upper dielectric layer may include at least one selected from a group consisting of a metal oxide, a metal nitride, and combinations thereof. The at least one selected from the group may be doped with at least one element selected from a group consisting of bismuth (Bi), boron (B), aluminum (Al), silicon (Si), magnesium (Mg), antimony (Sb), beryllium (Be), and combinations thereof.

Specifically, each of the first lower dielectric layer, the second lower dielectric layer and the upper dielectric layer may include at least one selected from a group consisting of titanium oxide, zinc tin oxide, zinc oxide, zinc aluminum oxide, tin oxide, bismuth oxide, silicon nitride, silicon aluminum nitride, silicon tin nitride and combinations thereof. The disclosure is not limited thereto. The selected at least one may be doped with at least one element selected from a group consisting of bismuth (Bi), boron (B), aluminum (Al), silicon (Si), magnesium (Mg), antimony (Sb), beryllium (Be), and combinations thereof. This may contribute to improving durability.

A thickness of each of the first lower dielectric layer and the second lower dielectric layer may be in a range of from about 5 nm to about 50 nm.

Further, a thickness of the upper dielectric layer may be in a range of from about 30 nm to about 50 nm.

A heat treatment process may occur during the manufacturing of the functional building material for the window and the door including the low-emissivity coating. Thus, in one implementation, the barrier layer may protect the low-emissivity coating from the heat from the heat treatment process. Further, the barrier layer may protect the low-emissivity coating from the hot and humid environment when the window is left in the hot and humid environment. Moreover, the barrier layer may protect the low-emissivity coating from the physical damage during transportation or handling of the glass.

The low-emissivity coating includes the barrier layer. Thus, the barrier layer may prevent the physical and chemical diffusion of alkali ions and oxygens from the underlying transparent glass substrate into the low-emissivity layer. Accordingly, the barrier layer may function to protect the low-emissivity coating from the above-described heat treatment process and high temperature and high humidity environment. Further, the barrier layer improves an interfacial adhesion between the glass substrate and the low-emissivity coating to improve the abrasion resistance of the low-emissivity coating.

Accordingly, the functional building material for the window and the door including the barrier layer may be excellent in heat resistance, moisture resistance and abrasion resistance.

The barrier layer may include, for example, one selected from a group consisting of metal oxides, metal nitrides, metal oxynitride, complex metal oxides, complex metal nitrides, complex metal oxynitride, and combinations thereof. In one implementation, the barrier layer may include one selected from a group consisting of silicon oxide, silicon aluminum oxide, zirconium oxide, zirconium silicon oxide, titanium oxide, titanium zirconium oxide, silicon oxynitride, silicon aluminum oxynitride, zirconium oxynitride, zirconium silicon oxynitride, titanium oxynitride, titanium zirconium oxynitride, and combinations thereof.

The barrier layer may have a thickness of about 1 nm to about 30 nm.

When the barrier layer has the thickness within the above defined range, the low-emissivity coating may realize sufficient heat resistance, moisture resistance, and abrasion resistance without having to increase the thickness of the low-emissivity coating excessively.

In one example, a highest protective layer may be disposed on the upper dielectric layer.

The highest protective layer may have a multilayer structure including a vertical sequential stack of a metal layer, a metal oxide layer and a silicon-aluminum-based complex metal oxynitride layer.

The metal layer may be formed by depositing an initial metal layer on the upper dielectric layer and performing a post-oxidation process of a surface portion of the initial metal layer to partially oxidize the metal layer to form the metal oxide layer. In this connection, the meal layer may mean a metal layer that is not oxidized and remains.

The metal layer may include at least one selected from silicon (Si), aluminum (Al), titanium (Ti), zirconium (Zr), silicon based complex metal, titanium based complex metal, zirconium based complex metal and combinations thereof. The metal layer may preferably include zirconium or zirconium-based complex metal. However, the present disclosure is not limited thereto.

That is, the metal layer is formed by being deposited on the upper dielectric layer. Thus, the metal layer inhibits the diffusion of chemical reactants such as $O_2$, $H_2O$ and $Na^+$, so that the low-emissivity coating may have excellent chemical properties such as moisture resistance, acid resistance, and alkali resistance.

Further, a thickness of the metal layer may be preferably in a range of 0.5 nm to 5 nm, but is not limited thereto.

In this connection, the thickness of the metal layer refers to a thickness of the metal layer which is not oxidized and remains when the surface of the initial metal layer is partially oxidized to form the metal oxide layer via the post-oxidation process onto the surface of the initial metal layer.

In this connection, when the thickness of the metal layer is smaller than 0.5 nm, this deteriorates excellent chemical properties of the low-emissivity coating such as moisture resistance, acid resistance, and alkali resistance. When the thickness of the metal layer exceeds 5 nm, the transmittance of the low-emissivity coating decreases.

The metal oxide layer is formed on a top face of the metal layer. The formation of the metal oxide layer may allow excellent mechanical properties of the low-emissivity coating membrane and inhibits diffusion of chemical reactants such as $O_2$, $H_2O$ and $Na^+$ into the low-emissivity layer, thereby to achieve excellent chemical properties of the low-emissivity coating.

In particular, when the formation of the metal oxide layer is performed by partially oxidizing the surface portion of the initial metal layer via the post-oxidation process onto the surface of the initial metal layer, a volume expansion occurs during the metal oxide formation as the metal is oxidized via the post-oxidation process. This volume expansion may result in formation of a high density metal oxide layer, which may further increase a hardness of the low-emissivity coating.

That is, according to the present disclosure, when the metal oxide layer is formed by partially oxidizing the surface portion of the initial metal layer via the post-oxidation process on the surface of the initial metal layer, the hardness of the low-emissivity coating may be significantly increased compared to a case where only the metal oxide layer is omitted from the topmost coating layer.

The metal oxide layer includes at least one selected from a group consisting of silicon oxide ($SiO_2$), aluminum oxide ($Al_2O_3$), titanium oxide ($TiO_2$), zirconium oxide ($ZrO_2$), silicon based complex metal oxide, titanium based complex metal oxide, zirconium based complex metal oxide, and combinations thereof. More preferably, the metal oxide layer includes zirconium oxide or zirconium complex metal oxide, but is not limited thereto.

A thickness of the metal oxide layer is preferably in a range of 0.5 nm to 5 nm, but is not limited thereto. For example, when the metal oxide layer is partially oxidized through the post-oxidation process of the metal layer surface, an initial thickness of the initial metal layer may be between 1 nm and 10 nm. During the post-oxidation process, 0.5 nm to 5 nm thickness of the surface portion of the initial metal layer may be oxidized, which may correspond to the thickness of the metal oxide layer.

The silicon or zirconium based complex metal oxynitride layer may be formed by deposition of a silicon or zirconium based complex metal oxynitride. The silicon-based or zirconium-based complex metal oxynitride may be an alloy based oxynitride whose main component in the complex metal is silicon or zirconium. The mechanical properties such as abrasion resistance can be further improved due to the excellent hardness of the silicon or zirconium based complex metal oxynitride layer.

For example, the silicon-based complex metal oxynitride may include silicon aluminum oxynitride. The zirconium-based complex metal oxynitride may include zirconium aluminum oxynitride. The present disclosure is not limited to thereto.

In this connection, deposition of a silicon or zirconium based complex metal oxynitride may be performed at the same time as forming the metal oxide layer by partially oxidizing the surface of the initial metal layer, as described above.

A thickness of the silicon-based or zirconium-based complex metal oxynitride layer may be between 2 nm and 20 nm. In this connection, when the thickness of the silicon-based or zirconium-based complex metal oxynitride layer is smaller than 2 nm, mechanical properties such as abrasion resistance are deteriorated. When the thickness of the silicon-based or zirconium-based complex metal oxynitride layer exceeds 20 nm, the transmittance decreases.

Controlling the transmittance and reflectance of the low-emissivity coating based on the light wavelength band via adjusting the material and thickness of each of the layers that constitute the low-emissivity coating may allow realizing an optical spectrum suitable for the application of the low-emissivity coating. For example, the low-emissivity coating improves natural-lighting performance by increasing the visible light transmittance, thereby securing a transparent field of view, while reducing the infrared emissivity, thereby securing an excellent thermal insulation effect.

Controlling the material and thickness of each of the layers constituting the low-emissivity coating may provide for fine control over the optical performance such as color, reflectance, and transmittance of a high-reflection surface of the low-emissivity coating that is visible from the outside.

In another implementation of the present disclosure, there is provided a functional building material for a window and a door, the building material including a transparent substrate; and the low-emissivity coating on at least one face of the transparent substrate.

The low-emissivity coating is coated on at least one face of the substrate, for example, top and/or bottom faces thereof. Specifically, the low-emissivity coating may include a vertical sequential stack of a first lower dielectric layer, a barrier layer, a second lower dielectric layer, a low-emissivity protective layer, a low-emissivity layer, a low-emissivity protective layer and an upper dielectric layer in this order.

Further, a top protective layer may be further layered on the upper dielectric layer. The highest protective layer may be embodied as a vertical sequential stack of a metal layer, a metal oxide layer, and a silicon or zirconium based complex metal oxynitride layer on the top face of the upper dielectric layer. Thus, the top protective layer may have a multi-layer structure.

The first lower dielectric layer, the barrier layer, the second lower dielectric layer, the low-emissivity protective layer, the low-emissivity layer, the low-emissivity protective layer, the upper dielectric layer and the highest (top) protective layer may be identical with those as described above in one implementation.

The transparent glass substrate may be embodied as a transparent substrate having a high visible light transmittance. For example, the substrate may be embodied as a glass or transparent plastic substrate having a visible light transmittance of about 80% to about 100%. In one example, the transparent glass substrate may be embodied, without limitation, as any glass used for a construction purpose. For example, a thickness of the substrate may be in a range of from about 2 mm to about 12 mm. The thickness may vary depending on the purpose and function of the window. The present disclosure is not limited thereto.

In order to manufacture the functional building material for the window and the door, first, the transparent glass substrate may be prepared, and then layers constituting the low-emissivity coating may be sequentially formed on the substrate. Each of the layers constituting the low-emissivity coating may be formed using a known method or using a method suitable for realizing a desired physical property.

In one example, each of the layers constituting the low-emissivity coating may be formed using a sputtering method or the like.

The Present and the Comparative Examples in the present disclosure are described below. The Present Examples below are only an example of the present disclosure. Thus, the present disclosure is not limited to the Present Examples below.

PRESENT EXAMPLE

Present Example 1

Using a magnetron sputtering evaporator (Selcos Cetus-S), a multi-layered low-emissivity coating coated on a transparent glass substrate was prepared as follows.

A SiAl target was deposited on a 6 mm thick transparent glass substrate under a argon/nitrogen (argon flow rate: nitrogen flow rate=80:10) atmosphere as a nitrogen-containing reactive gas to form a first lower dielectric layer having a thickness of 10 nm. Then, a barrier layer was formed by depositing a 3 nm thick $ZrO_x$ metal oxide layer on a top face of the first lower dielectric layer under an atmosphere of argon/oxygen (argon 10 vol %, oxygen 90 vol %). Then, a SiAl target was deposited on a top face of the barrier layer under a argon/nitrogen (argon flow rate:nitrogen flow rate=80:20) atmosphere as a nitrogen-containing reactive gas to form a second lower dielectric layer having a thickness of 35 nm.

Next, a low-emissivity protective layer was formed on a top face of the second lower dielectric layer by depositing a NiCr layer having a thickness of 1.0 nm under argon 100% atmosphere. Then, Ag was deposited on a top face of the low-emissivity protective layer under 100% argon atmosphere to form a 12 nm thick low-emissivity layer. A NiCr layer of a thickness of 1.0 nm was deposited on a top face of the low-emissivity layer under 100% argon atmosphere to form a low-emissivity protective layer.

Then, a SiAl target was deposited on a top face of the low-emissivity protective layer under a argon/nitrogen (argon flow rate:nitrogen flow rate=80:20) atmosphere as a nitrogen-containing reactive gas to form an upper dielectric layer having a thickness of 40 nm. In this way, the multi-layered low-emissivity coating coated on the transparent glass substrate was prepared.

Present Example 2

The low-emissivity coating coated on the transparent glass substrate was prepared in the same manner as in Present Example 1. Then, the highest or top protective layer was formed on a top face of the upper dielectric layer. Specifically, zirconium was deposited on a top face of the upper dielectric layer under a 100% argon atmosphere to form a 4 to 5 nm thick zirconium layer. Then, a surface portion of the zirconium layer as the metal layer was post-oxidized, such that the surface of the zirconium layer was partially oxidized to form a zirconium oxide layer having a thickness of 3 to 4 nm. Then, depositing silicon aluminum oxynitride on a top face of the zirconium oxide layer to form a 10 nm thick silicon aluminum oxynitride layer. In this way, the highest or top protective layer was formed.

Comparative Example 1

A functional building material for a window and a door was manufactured in the same manner as in Present Example 1, except that a SiAl target was deposited on a 6 mm thick transparent glass substrate under a argon/nitrogen (argon flow rate:nitrogen flow rate=80:10) atmosphere as a nitrogen-containing reactive gas to form a single lower dielectric layer having a thickness of 45 nm (that is, the second lower dielectric layer in Present Example 1 was omitted) and except that the barrier layer was omitted.
Evaluation Experimental Example 1

Evaluation of Heat Resistance

Hazes of the functional building materials for the window as manufactured according to Present Examples 1 and 2 and Comparative Example 1 as samples were measured.

Then, the functional building materials for the window as manufactured according to Present Examples 1 and 2 and Comparative Example 1 as samples were put into a box furnace equipment for laboratory (AJEON HEATING INDUSTRIAL.CO. LTD). Then, a temperature inside of the equipment was kept at about 700° C. After holding the samples therein for 5 minutes, the samples were taken out from the furnace. After this tempering treatment, hazes thereof were measured.

Then, for each sample, a difference between the hazes as measured before and after the tempering process was calculated and was shown in Table 1 below.

The haze was measured using Haze Meter (BYK Gardner, Haze-gard plus).

Further, after performing the heat resistance evaluation, each glass substrate coated with each low-emissivity coating according to each of Present Examples 1 and 2 and Comparative Example 1 was photographed with an optical microscope (KONICA MINOLTA, CM-3500D, magnification×200), and the imaging result is shown in FIG. 2.

As shown in Table 1 and FIG. 2, it was confirmed that, in Comparative Example 1, the defect level is high due to a large haze difference.

On the other hand, it is understood that in Present Examples 1 and 2, the defect level is low due to a decrease in a structural deformation of the low-emissivity coating. It may be confirmed that a thermal property in Present Examples 1 and 2 is excellent compared with Comparative Example 1.

TABLE 1

| | Example | | |
|---|---|---|---|
| | Present Example 1 | Present Example 2 | Comparative Example 1 |
| Haze change | 0.09 | 0.07 | 4.70 |

Experimental Example 2

Evaluation of Abrasion Resistance

The functional building materials for a window manufactured according to Present Examples 1 and 2 and Comparative Example 1 as the samples were tested in terms of an abrasion resistance using a washing machine (MANNA, MGR-460).

Then, the functional building materials for the window as manufactured according to Present Examples 1 and 2 and Comparative Example 1 as samples were put into a box furnace equipment for laboratory (AJEON HEATING INDUSTRIAL.CO. LTD). Then, a temperature inside of the equipment was kept at about 700° C. After holding the samples therein for 5 minutes, the samples were taken out from the furnace. After this tempering treatment, the samples were tested in terms of an abrasion resistance using a washing machine (MANNA, MGR-460).

Next, in the abrasion resistance tests conducted before and after the tempering process, presence or absence of scratches on the surface of each low-emissivity coating was visually observed, and the type or shape of the observed scratches is shown in Table 2.

The scratch having a width of about 50 µm or larger was counted because 50 µm is a minimum size for visual observation.

Figure 3:
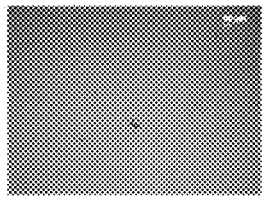
FIG. 3 shows optical microscope images of low-emissivity coating surfaces as prepared according to Present Example and Comparative Example under a specific condition before and after evaluating abrasion resistances of window functional building materials including the low-emissivity coating as prepared according to Present Example and Comparative Example.

Further, before and after performing the abrasion resistance evaluation, each low-emissivity coating-coated glass substrate was photographed with an optical microscope (KONICA MINOLTA, CM-3500D, magnification×50), and the imaging results are shown in FIG. 3.

TABLE 2

| | Example | | |
|---|---|---|---|
| | Present Example 1 | Present Example 2 | Comparative Example 1 |
| Before tempering process | No scratch | No scratch | Area scratch occurrence |
| After tempering process | No scratch | No scratch | Area scratch occurrence |

As shown in the Table 2 and FIG. 3 we could confirm that the scratch level was too high and the wear resistance was poor in the Comparative Example 1.

On the other hand, in Present Examples 1 and 2, the scratch did not occur due to a decrease in a structural deformation of the low-emissivity coating. Thus, it may be confirmed that in Present Examples 1 and 2, the abrasion resistance is excellent compared with Comparative Example 1.

REFERENCE NUMERALS

100: low-emissivity coating
110: first lower dielectric layer, 120: barrier layer, 130: second lower dielectric layer
140, 160: low-emissivity protective layer
150: low-emissivity layer
170: upper dielectric layer

What is claimed is:
1. A functional building material comprising a transparent substrate; and a low-emissivity coating on at least one side of the transparent substrate, wherein the low-emissivity coating comprises:

a first lower dielectric layer, wherein the first lower dielectric layer comprises silicon aluminum nitride, and a thickness of the first lower dielectric layer ranges from 5 nm to 10 nm;
a barrier layer, wherein the barrier layer consists of zirconium oxide, and a thickness of the barrier layer ranges from 3 nm to 30 nm;
a second lower dielectric layer, wherein the second lower dielectric layer comprises silicon aluminum nitride, wherein a thickness of the second lower dielectric layer ranges from 5 nm to 35 nm;
a first low-emissivity protective layer;
a low-emissivity layer, wherein the low-emissivity layer comprises silver (Ag), and a thickness of the low-emissivity layer ranges from 5 nm to 12 nm;
a second low-emissivity protective layer;
an upper dielectric layer, wherein the upper dielectric layer comprises silicon aluminum nitride, and a thickness of the upper dielectric layer ranges from 30 nm to 40 nm; and
a top protective layer, wherein the top protective layer comprises a metal layer, a metal oxide layer and a silicon aluminum oxynitride layer stacked in this order, and wherein a thickness of the silicon aluminum oxynitride layer ranges from 10 nm to 20 nm,
wherein the first lower dielectric layer, the barrier layer, the second lower dielectric layer, the low-emissivity protective layer, the low-emissivity layer, the low-emissivity protective layer, the upper dielectric layer and the top protective layer are stacked vertically in this order,
wherein each of the low-emissivity protective layers comprises nickel-chromium alloy (Ni-Cr), and
wherein a thickness of each of the low-emissivity protective layers ranges from 0.5 nm to 1 nm.

2. The functional building material of claim 1, wherein each of the low-emissivity protective layers is composed of a single layer or multiple layers.

3. The functional building material of claim 1, wherein each of the low-emissivity protective layers has an extinction coefficient of 1.5 to 3.5 in a visible light region.

4. The functional building material of claim 1, wherein the transparent substrate is a glass or transparent plastic substrate having a visible light transmittance of 80% to 100%.

* * * * *